United States Patent [19]

Glass et al.

[11] 4,180,433
[45] Dec. 25, 1979

[54] PRODUCTION OF IMPROVED CHRYSOTILE ASBESTOS FIBRES

[75] Inventors: Roger W. Glass, Oakville; Richard A. Kuntze, Mississauga, both of Canada

[73] Assignee: Ontario Research Foundation, Sheridan Park, Canada

[21] Appl. No.: 824,929

[22] Filed: Aug. 15, 1977

Related U.S. Application Data

[63] Continuation-in-part of Ser. No. 682,854, May 3, 1976, abandoned.

[51] Int. Cl.$^2$ ............................................. D21B 1/02
[52] U.S. Cl. ...................................... 162/3; 162/153; 162/154; 423/167; 423/331
[58] Field of Search .......................... 162/3, 153, 154; 423/167, 331

[56] References Cited

U.S. PATENT DOCUMENTS

| | | | |
|---|---|---|---|
| 1,545,132 | 7/1922 | Drambour | 162/3 |
| 2,616,801 | 11/1952 | Badollet et al. | 162/153 |
| 2,669,166 | 2/1954 | Smith | 162/153 |
| 3,096,200 | 7/1963 | Quinn | 162/153 |
| 3,597,514 | 8/1971 | Erlandgen | 162/153 |

OTHER PUBLICATIONS

"Heat Treatment of Chrysotile Asbestos Fibers," Badollet et al. Feb. 1955 pp. 65–69.

Primary Examiner—S. Leon Bashore
Assistant Examiner—Peter F. Kratz
Attorney, Agent, or Firm—Sim & McBurney

[57] ABSTRACT

The filtration rate of asbestos-cement slurries formed from chrysotile asbestos fibres is improved by controlled heat treatment of the fibres at a temperature of about 400° to about 600° C. without loss of water of crystallization and fibre strength. The improved filtration rate allows an increased rate of production of asbestos-cement products.

11 Claims, No Drawings

PRODUCTION OF IMPROVED CHRYSOTILE ASBESTOS FIBRES

REFERENCE TO RELATED APPLICATION

This application is a continuation-in-part of our co-pending application Ser. No. 682,854 filed May 3, 1976 now abandoned.

FIELD OF INVENTION

This invention relates to a process for producing chrysotile asbestos fibres with improved properties when used as a reinforcing agent for asbestos-cement products.

BACKGROUND TO THE INVENTION

Chrysotile asbestos is a fibrous or asbestiform magnesium silicate mineral and is the only member of the serpentine sub-group of asbestos. The individual fibrils of chrysotile, measuring about 300 to 400 Å in diameter, have a scroll-like structure consisting of alternating layers of silica and brucite. The hydroxyl groups of the outermost brucite layer represent the surface of the fibrils. In contrast, a silica layer represents the surface in amphiboles and this fundamental difference is the reason for most of the differences in the physical properties of the two materials.

After conventional mining and milling, chrysotile asbestos is available as fibres, up to about 5 mm in diameter, which are in the form of bundles of fibrils. These bundles may be sub-divided further by mechanical action, and the degree of sub-division of the fibres is generally expressed in terms of average surface area of the product. Chrysotile asbestos fibre produced by a conventional mill ranges in surface area between about 3000 and 5000 cm$^2$/g and is generally provided in pressure packed form with a density of about 25 to about 50 lb/ft$^3$.

Chrysotile asbestos is used in the manufacture of asbestos-cement products, such as, pipes and sheets. The manufacturing process consists of filtering a slurry of asbestos and portland cement (or portland cement partially substituted with silica flour) through a filter drum rotating in a vat. The thin layer of asbestos-cement formed continuously on the drum is transferred first to an endless filtration felt that moves over suction boxes, and is subsequently wound onto a mandrel.

It is necessary for this procedure for the chrysotile asbestos to be opened prior to formation of the slurry thereof with the cement, since the fibres produced by the asbestos mill are too coarse for effective use in this procedure. Opening of chrysotile fibres consists of mechanical action to separate these fibres into more fibres of smaller diameter. During the opening of the fibres, shortening of the fibres to a limited extent is unavoidable. It is known that fibres of shorter length provide lesser strength characteristics than fibers of longer length.

Water is removed from the asbestos-cement slurry at two stages of the above procedure: (1) on the filter drum, and (2) at the suction boxes. The rate at which the water can be removed is one of the most important properties of the asbestos-cement slurry, because the rate of water removal determines the rate of production of the products. In general, when chrysotile asbestos is used as the sole asbestos fibre in the slurry, the filtration rates obtained are poor (i.e., about 6 to about 12 ml/sec.).

Where "filtration rates" are referred to in this specification, the values given are those determined at a weight ratio of cement to asbestos of 7:1 and ratio of water to total solids in the slurry of 11.5 ml/g.

It is common practice, therefore, to substitute up to 30% by weight of the chrysotile by one or more other naturally-occurring asbestos fibre from the amphibole sub-group of asbestos, namely, amosite and crocidolite (blue asbestos), which possess high filtration rates (i.e., about 19 to about 20 ml/sec.), in order to improve the overall filtration properties of the asbestos cement. This practice has drawbacks, however, since amosite is normally considered to contribute little to the flexural strength of asbestos-cement products while crocidolite has been associated with health problems and its use in industrial applications is either prohibited or subject to severe restrictions. Moreover, both materials are in short supply.

Attempts to improve the filtration properties of asbestos-cement slurries by the addition of surfactants, coagulants, etc. have met with limited success. Similarly, treatment of the chrysotile asbestos with sodium silicate has been only partially successful in improving the filtration properties.

In U.S. Pat. No. 2,616,801, there is described a heat treatment operation for the improvement of the filtration properties of chrysotile asbestos in which the fibres are heated for very short periods of time not exceeding 3 minutes by passage through a combustion flame. The heat treatment is described as being effected at a temperature of 600° to 1200° F. (315° to 650° C.), although the procedure utilized does not permit close temperature control. The heat treatment in this prior art process is indicated to be accompanied by a loss of water of crystallization from the fibres and a corresponding strength loss.

A paper by the authors of the patent entitled "Heat Treatment of Chrysotile Asbestos Fibres", Canadian Institute of Mining, Transactions, Vol. LVIII, 1955, pages 33 to 37, describes a direct correlation between improved filtration properties and water loss and indicates that improved filtration properties cannot be attained without water loss and consequent strength loss.

Strength losses from the fibres are detrimental to the use of the fibres in asbestos cement products and should be avoided, if possible. As already mentioned, some strength loss may occur on opening of the fibres to the surface area required for asbestos-cement uses, but this is tolerated in the absence of a viable alternative.

SUMMARY AND GENERAL DESCRIPTION OF THE INVENTION

In accordance with the present invention, chrysotile asbestos fibres are heat treated to obtain an improvement in the filtration properties of the fibres in asbestos cement uses without incurring any strength loss through loss of water of crystallization other than a very minor loss. This invention, therefore, is able to achieve improved filtration properties in the absence of water and strength loss, in contrast to the disclosure of the prior art patent and literature referred to above.

In accordance with the present invention, chrysotile asbestos fibres are heated in an ambient atmosphere having a substantially uniform temperature of about 400° to about 600° C. for a time from about 1 to about 5 hours sufficient to increase the filtration properties of the fibres in asbestos-cement uses and insufficient to result in a significant degree of dehydroxylation of the fibres. It is the dehydroxylation of the asbestos fibres which leads to the undesirable strength losses mentioned above.

The heating of fibres is controlled by a temperature-time relationship to avoid loss of water of crystallization and the maximum water loss (dehydroxylation) which can be tolerated is about 2% by weight of the total water of crystallization, the latter value being the "significant degree of dehydroxylation" mentioned above. It is preferred to achieve the increased filtration properties without any dehydroxylation.

By controlling the temperature-time heating relationship to maintain any loss of water of crystallization to a less than about 2% by weight of the total water of crystallization, and preferably to achieve no dehydroxylation, any strength losses from the chrysotile asbestos fibres are minimal.

In view of the disclosure of the prior art U.S. patent and literature reference referred to above wherein it is indicated that water and strength losses are a prerequisite to obtaining improved filtration properties, it is surprising that improved filtration properties in asbestos-cement uses can be obtained using the procedure of this invention without any or only an insignificant loss of water of crystallization of the fibres and consequently without at the most a minimal strength loss of the fibres.

Also in contrast to the prior art, the length of time for which the fibres are heated in this invention is very much longer than that disclosed in the U.S. Patent and in the literature. It is surprising that we can obtain improved filtration properties in asbestos cement uses without strength loss utilizing heating times from about 1 to about 5 hours in the temperature range of about 400° to about 600° C., in view of the indicated maximum heating time of 3 minutes at a temperature in the range of about 315° to about 650° C. in the U.S. Patent, which itself leads to some strength loss (as much as 20% by weight loss of water of crystallization and as much as 25% loss of fibre strength are indicated to be tolerated), and the indication in the patent that prolonged heating adversely affects the strength properties of the fibres. It is also surprising that we require a minimum heating temperature of about 400° C. and that heating at 300° to 350° C. for as long as five hours produces no improvement in filtration properties or strength loss in view of the description in the U.S. patent of heating at temperatures below 400° C. for under 3 minutes to produce a beneficial result, accompanied by strength losses. These differences appear to result from the modes of heating used in the two processes.

In the procedure of the U.S. patent, fibres are allowed to fall through a flame, resulting in an uncontrolled temperature profile within the treatment unit. Many of the fibres will have a much higher temperature than nominal temperature measured at the walls of the treatment unit and these higher temperatures lead to dehydroxylation observed.

In contrast, in the procedure of this invention, the fibres are placed in an ambient atmosphere having a substantially uniform temperature, thereby permitting the fibres to attain the ambient temperature and avoiding overheating during the heat treatment. Typically, the procedure of this invention is effected in a large scale muffle furnace.

DESCRIPTION OF PREFERRED EMBODIMENTS

The heat teatment effected in accordance with this invention increases the filtration rate of the chrysotile asbestos fibres in asbestos cement uses. It is preferred to increase the filtration rate from the value for the untreated fibre in asbestos-cement uses, i.e., about 11 to about 12 ml/sec, to a value comparable to that of crocidolite in asbestos-cement uses, i.e., about 19 to about 20 ml/sec, although higher values may be attained. In this way, it is possible to provide asbestos fibres having a high filtration rate in asbestos-cement uses without the drawbacks of the amphiboles.

While the procedure has wide applicability to a variety of grades of chrysotile asbestos fibres, it has particular utility with respect to those chrysotile asbestos fibres classified as Group 4 and Group 5 by Quebec Asbestos Mining Association, since these classes of fibres are among those most commonly used in asbestos cement.

The asbestos fibres may be treated by the procedure of the invention in a bulk form but it is more convenient and preferred to treat the fibres in a pressure packed form. Pressure packing decreases considerably the volume of the fibres to be treated and permits commercial operation, since large volumes of fibres can be simultaneously heat treated.

When in the pressure packed form, it takes some time for the heat to permeate the block, so that fibres in outer portions of the block may be heat treated at the ambient atmosphere temperature for longer periods than those towards the centre of the block. This heating pattern results in an overall improvement in filtration properties in asbestos-cement uses for the fibres in the block without strength loss, although the individual filtration properties of the fibres in the block may vary.

Pressure packing, when effected, is preferably carried out to provide a density in the pressure pack of about 25 to about 50 lb.cu.ft. The pressure pack typically is formed from a 100 lb. lot of fibres and may be dimensioned 24"×16"×9". Prior to pressure packing, it is preferred to provide the fibres in a form having an average surface area of about 8000 to 12,000 sq.cm./g.

This surface area may be achieved by selecting fibres of this surface area by classification of the initial fibres to separate coarse fibres and utilize the fine fibres, opening the fibres to the required surface area or by a combination of classification and fibre opening. Usually, opening of the fibres is necessary.

In a preferred embodiment of the invention, the chrysotile fibres are heated in an ambient atmosphere having a temperature of about 500° to about 550° C. for about 2 to 3 hours, usually in a pressure packed form having a density of about 25 to about 50 lb/cu.ft.

The heating process carried out in accordance with this invention changes the physical characteristics of the asbestos fibres. Most importantly, the fibres become stiffer and more coherent because of an increase in the interfibrillar bond. In the prior art literature referred to above, this increase in stiffness is associated with loss of water of crystallization from the fibres. In this invention, the increase in stiffness is achieved without loss of water of crystallization.

The stiffening of the fibres on heat treatment in accordance with this invention results in a greater degree of shortening of the fibres during their separation by mechanical action with consequent strength losses than would be the case if the mechanical action were carried out prior to heating and hence any opening of the fibres which is desired is preferably effected prior to the heating rather than following the heating.

It is possible, however, to avoid strength loss even if the fibres are opened after the heat treatment, by utilizing a controlled opening operation. In the latter procedure, the initial fibres having a surface area of about 3000 to 5000 sq.cm/g is heat treated and thereafter the fibres are opened to a limited extent to provide an average surface area of about 6000 to about 8000 sq.cm/g. The fibres then are classified to provide a fine fraction having the average surface area required for asbestos-cement uses, the heavy fraction being rejected. The fine fraction produced using this procedure is found to have improved asbestos-cement filtration properties without strength loss.

EXAMPLES

The invention is illustrated by the following Examples:

Example I

Chrysotile asbestos fibres (Group 5), opened to a surface area of 10,000 cm²/g, were pressure packed to a density of 50 lb/ft³ and heated at an ambient temperature of 500° C. for 2 hours in a muffle furnace. Following heat treatment and cooling, the fibres were dispersed by light mechanical action. The procedure was repeated except that the raw fibres were first pressure packed and heat treated and then opened following the heat treatment.

The properties of the materials with respect to asbestos-cement production were determined and compared with those of untreated fibres, amosite and crocidolite. The results are reproduced in the following Table I:

TABLE I

| Fibre | Surface Area cm²/g | Filtration Rate ml/sec. | Asbestos-Cement Density g/cm³ | Modulus of Rupture* kg/cm² |
|---|---|---|---|---|
| Untreated Fibre | 10,100 | 11.9 | 1.62 | 441 |
| Fibre Heat Treated Before Opening | 10,700 | 20.4 | 1.45 | 370 |
| Fibre Heat Treated After Opening** | 10,400 | 19.2 | 1.47 | 440 |
| Amosite | 11,800 | 22.7 | 1.46 | 337 |
| Crocidolite | 12,000 | 19.7 | 1.44 | 387 |

*2 hours at 500° C.
**Adjusted to density of 1.6 g/cm³

The results of the above Table I quite clearly demonstrate the improvement in filtration rate achieved by the heat treatment procedure and that strength loss occurs only if the fibre is heat treated before opening.

Example II

Chrysotile asbestos fibres (Group 5), opened to a surface area of 11,000 cm²/g, were pressure packed to a density of 50 lb/ft³ and heated at an ambient temperature of 550° C. for 3 hours in a muffle furnace. Following heat treatment and cooling, the fibres were dispersed by light mechanical action.

The properties of the treated fibres when used to prepare asbestos-cement products were determined and compared with those of untreated fibres, crocidolite, and substitutions of up to 30% of the untreated fibre by treated fibre or crocidolite. The results are reproduced in the following Table II:

TABLE II

| Fibre | Surface Area cm²/g | Filtration Rate ml/sec. | Asbestos-Cement Density g/cm³ | Modulus of Rupture* kg/cm² |
|---|---|---|---|---|
| 100% Untreated Fibre | 12,000 | 10.9 | 1.61 | 479 |
| Containing 10% Crocidolite | — | 11.4 | 1.60 | 469 |
| Containing 20% Crocidolite | — | 11.8 | 1.58 | 466 |
| Containing 30% Corcidolite | — | 12.4 | 1.57 | 456 |
| 100% Crocidolite | 12,000 | 19.1 | 1.48 | 392 |
| Containing 10% Treated Fibre** | — | 13.0 | 1.60 | 482 |
| Containing 20% Treated Fibre** | — | 14.6 | 1.60 | 487 |
| Containing 30% Treated Fibre** | — | 15.1 | 1.58 | 488 |
| 100% Treated Fibre | 11,000 | 22.5 | 1.44 | 484 |

*Adjusted to density of 1.6 g/cm³
**3 hours at 550° C.

The superiority of the heat treated fibres in asbestos-cement use, as evidenced by the filtration rate and strength values, is again demonstrated by the results of the above Table II.

Example III

Chrysotile asbestos fibres (Group 5), opened to a surface area of 10,000 sw.cm./g, were pressure packed into samples having a density of 50 lb/cu.ft. The opened fibres had an initial asbestos cement filtration rate of 11 ml/sec, a modulus of rupture value of 424 kg/sq.cm and a water of crystallization content of 12% by weight, as determined by weight loss on ignition.

Each sample was heated in an ambient atmosphere for a particular time period at a temperature in a muffle furnace. In each case, the filtration and strength properties of the heat treated fibres were determined along with the residual water of crystallization of the fibres, and these values are tabulated as the following Table III:

TABLE III

| Treatment Time (hrs) | Parameter | Temperature (°C.) | | | |
|---|---|---|---|---|---|
| | | 300 | 400 | 500 | 600 |
| 1 | FR(1) | 11 | 11 | 12 | 14 |
| | LOI(2) | 12 | 12 | 12 | 11.9 |
| | MOR(3) | 425 | 420 | 429 | 416 |
| 2 | FR | 11 | 13 | 22 | 20 |
| | LOI | 12 | 12 | 12 | 11.8 |
| | MOR | 420 | 415 | 421 | 402 |
| 3 | FR | 11 | 13.5 | 19 | 24 |
| | LOI | 12 | 12 | 12 | 10.9 |
| | MOR | 439 | 422 | 414 | 360 |
| 4 | FR | 11 | 17 | 21 | 28 |
| | LOI | 12 | 12 | 11.7 | 10 |
| | MOR | 420 | 430 | 391 | 320 |
| 5 | FR | 11 | 19 | 24 | 26 |
| | LOI | 12 | 12 | 11.4 | 9.1 |
| | MOR | 410 | 450 | 389 | 300 |

Notes:
(1)FR is the asbestos-cement filtration rate of treated fibre in ml/sec.
(2)LOI is the weight loss of the heat treated fibres in % and is the measure of the water of crystallization content of the fibres.
(3)MOR is the modulus of rupture of asbestos cement in kg/cm². These values are accurate only within ±5%.

It will be seen from the results of the above Table III that a minimum temperature of 400° C. is required to achieve any improvement in asbestos cement filtration properties and the heating time must be controlled within the temperature range of 400° to 600° C., if no more than 2% by weight of the total loss of water of crystallization is to be achieved, corresponding to 0.25% by weight loss in the LOI values. The modulus of rupture data in Table III indicates a trend of loss of strength with loss of water of crystallization, as is evident from the following Table IV:

TABLE IV

| LOI (wt. %) | Water loss by heat treatment | | MOR value kg/sq.cm. | Temp/time heating (°C./hrs) |
|---|---|---|---|---|
| | % of fibre wt. | % total $H_2O$ | | |
| 12 | 0 | 0 | 421 | 500/2 |
| 11.9 | 0.1 | 0.8 | 416 | 600/1 |
| 11.8 | 0.2 | 1.7 | 402 | 600/2 |
| 11.7 | 0.3 | 2.5 | 391 | 500/4 |
| 11.4 | 0.6 | 5.0 | 389 | 500/5 |
| 10.9 | 1.1 | 7.6 | 360 | 600/3 |
| 10 | 2 | 17 | 320 | 600/4 |

As can be seen from Table III, the asbestos-cement filtration rate for the fibres generally increases with the length of time of heating but a point is reached in each case when further heating, while further increasing the asbestos cement filtration rate, leads to loss of water of crystallization and strength loss.

It is preferred to carry out the heating in such a manner as to maximize the increase in the asbestos cement filtration rate while avoiding dehydroxylation in the shortest possible time. From the results of Examples I to III, it is apparent that it is preferred to carry out the heating at an ambient temperature of about 500° to about 550° C. for about 2 to 3 hours.

Example IV

Chrysotile asbestos fibres (Group 4) of average surface area of 4000 sq.cm/g, were formed into a pressure-packed block and heated at an ambient temperature of 500° C. for 2 hours in a muffle furnace. Following the heat treatment and cooling of the block, the fibres were opened to an average surface area of about 7000 cm²/g using a fan opener.

The opened fibres were fed to a Centri-Sonic classifier operating under conditions which will produce 10 to 15% rejects (heavy fraction).

The fines fraction from the classifier was tested for its properties in asbestos-cement. Asbestos-cement filtration rate and modulus of rupture were compared with those of untreated fibres which had been otherwise processed to produce their optimum properties. The results are reproduced in the following Table V:

TABLE V

| Fibre | Surface Area cm²/g | Filtration Rate ml/sec. | Asbestos-Cement Density g/cm³ | Modulus of Rupture* kg/cm² |
|---|---|---|---|---|
| Fine Fraction After Heat Treatment** and Classification | 7,000 | 22.8 | 1.41 | 516 |
| Same Fibre Without Heat Treatment and Classification - Opened Only | 12,000 | 13.1 | 1.60 | 527 |

*Adjusted to density of 1.6 g/cm³
**2 hours at 500° C.

The results of the above Table V demonstrate that the heat treated, opened and fine classified fibres produced in accordance with the invention exhibit substantially no decrease in modulus of rupture and an increase in asbestos-cement filtration rate of about 75%.

Example V

Chrysotile asbestos fibres (Group 4) of average surface area of 10,000 sq.cm./g were heated in a fluffed layer 1-inch thick at 500° C. for 3 hours in a medium size muffle furnace. The results are shown in the following Table VI:

TABLE VI

| Fibre | Filtration Rate ml/sec | Asbestos-Cement Density g/cu.cm. | MOR kg/sq.cm. |
|---|---|---|---|
| Untreated | 12.5 | 1.62 | 448 |
| After heat treatment | 19.7 | 1.48 | 429 |

The results of the above Table VI demonstrate that the invention is applicable to fibres in a fluffed state as well as to those in pressure packed form.

SUMMARY

The present invention, therefore, provides a procedure for producing heat treated chrysotile asbestos fibres which have improved filtration properties without exhibiting other than minimal strength losses. Modifications are possible within the scope of the invention.

What we claim is:

1. A method for the production of chrysotile asbestos fibres having improved filtration properties in asbestos-cement uses, which comprises heating chrysotile asbestos fibres selected from Group 4 and Group 5 chrysotile asbestos fibres having a filtration rate in asbestos cement uses of about 11 to about 12 ml/sec in an ambient atmosphere having a substantially uniform temperature of about 400° to about 600° C. for a time from about 1 to about 5 hours sufficient to increase the filtration rate of said fibres in asbestos cement uses to at least about 19 ml/sec and insufficient to result in a loss of water of crystallization of the fibres of greater than about 2% by weight of the total weight of water of crystallization in the fibres, whereby said improved filtration properties are obtained without any significant overall fibre strength loss.

2. The method of claim 1 wherein said heating is effected to effect substantially the maximum increase in said filtration properties without any loss of water of crystallization from the fibres.

3. The method of claim 1 wherein said heating is carried out in an ambient atmosphere at a temperature of about 500° to about 550° C. for about 2 to 3 hours.

4. The method of claim 1 wherein said fibres are in a pressure packed form during said heating step.

5. The method of claim 4 wherein said fibres are pressure packed to a density of about 25 to about 50 lb/cu.ft.

6. The method of claim 1 wherein said chrysotile asbestos fibres have an average surface area of about 3000 to about 5000 sq.cm/g and are opened to an average surface area of about 8000 to about 12000 sq.cm/g prior to said heating step.

7. The method of claim 6 including pressure packing said opened fibres after said opening step and prior to said heating step to density of about 25 to about 50 lb/cu.ft.

8. The method of claim 1 including classifying asbestos fibres into a coarse fraction and a fine fraction prior to said heating step and subjecting said fine fraction to said heating step.

9. The method of claim 1 wherein said ambient atmosphere is provided in a muffle furnace.

10. The method of claim 1 wherein, prior to said heating, said fibres are provided in a form having a surface area of about 8000 to about 12000 sq.cm/g and said latter fibres are pressure packed to a density of about 25 to about 50 lb/cu.ft, and said heating step is effected in an ambient atmosphere at a temperature of about 500° to about 550° C. for about 2 to 3 hours.

11. The method of claim 10 wherein said ambient atmosphere is provided in a muffle furnace.

* * * * *